United States Patent
Cobo Rus et al.

(10) Patent No.: US 11,915,682 B2
(45) Date of Patent: Feb. 27, 2024

(54) SPEECH SYNTHESIS UTILIZING AUDIO WAVEFORM DIFFERENCE SIGNAL(S)

(71) Applicant: DeepMind Technologies Limited, London (GB)

(72) Inventors: Luis Carlos Cobo Rus, San Francisco, CA (US); Nal Kalchbrenner, Amsterdam (NL); Erich Elsen, Naperville, IL (US); Chenjie Gu, Sunnyvale, CA (US)

(73) Assignee: DeepMind Technologies Limited, London (GB)

( * ) Notice: Subject to any disclaimer, the term of this patent is extended or adjusted under 35 U.S.C. 154(b) by 91 days.

(21) Appl. No.: 17/610,934

(22) PCT Filed: May 20, 2019

(86) PCT No.: PCT/US2019/033104
§ 371 (c)(1),
(2) Date: Nov. 12, 2021

(87) PCT Pub. No.: WO2020/231449
PCT Pub. Date: Nov. 19, 2020

(65) Prior Publication Data
US 2022/0254330 A1  Aug. 11, 2022

Related U.S. Application Data

(60) Provisional application No. 62/848,314, filed on May 15, 2019.

(51) Int. Cl.
*G10L 13/00* (2006.01)
*G10L 19/00* (2013.01)
(Continued)

(52) U.S. Cl.
CPC ............ *G10L 13/047* (2013.01); *G10L 13/08* (2013.01); *G10L 25/30* (2013.01)

(58) Field of Classification Search
CPC .......... G10L 13/06; G10L 19/07; G10L 13/00
See application file for complete search history.

(56) References Cited

U.S. PATENT DOCUMENTS

| | | | |
|---|---|---|---|
| 10,860,977 B1 * | 12/2020 | Mishra | G06Q 10/087 |
| 2004/0210440 A1 * | 10/2004 | Lashkari | G10L 19/07 |
| | | | 704/E19.025 |

(Continued)

FOREIGN PATENT DOCUMENTS

| | | | | |
|---|---|---|---|---|
| JP | 4762553 B2 * | 8/2011 | | |
| JP | 6989951 B2 * | 1/2022 | | |
| WO | WO-9631872 A1 * | 10/1996 | | G10K 11/178 |

OTHER PUBLICATIONS

Gregor et al., "Temporal Difference Variational Auto-Encoder," CoRR, Jun. 2018, https://arxiv.org/abs/1806.03107, 17 pages.

(Continued)

*Primary Examiner* — Shreyans A Patel
(74) *Attorney, Agent, or Firm* — Fish & Richardson P.C.

(57) ABSTRACT

Techniques are disclosed that enable generation of an audio waveform representing synthesized speech based on a difference signal determined using an autoregressive model. Various implementations include using a distribution of the difference signal values to represent sounds found in human speech with a higher level of granularity than sounds not frequently found in human speech. Additional or alternative implementations include using one or more speakers of a client device to render the generated audio waveform.

24 Claims, 8 Drawing Sheets

(51) Int. Cl.
*G10L 13/047* (2013.01)
*G10L 13/08* (2013.01)
*G10L 25/30* (2013.01)

(56) References Cited

U.S. PATENT DOCUMENTS

2017/0345411 A1* 11/2017 Raitio ............... G10L 13/06
2018/0268806 A1* 9/2018 Chun ............... G10L 13/027

OTHER PUBLICATIONS

International Preliminary Report on Patentability in International Appln. No. PCT/US2019/033104, dated Nov. 25, 2021, 8 pages.
International Search Report and Written Opinion in International Appln. No. PCT/US2019/033104, dated Feb. 24, 2020, 14 pages.
Zen et al., "Fast, Compact, and High Quality LSTM-RNN Based Statistical Parametric Speech Synthesizers for Mobile Devices," Interspeech 2016, Sep. 2016, 14 pages.

* cited by examiner

SPEECH SYNTHESIS UTILIZING AUDIO WAVEFORM DIFFERENCE SIGNAL(S)

CROSS-REFERENCE TO RELATED APPLICATION

This application is a National Stage Application under 35 U.S.C. § 371 and claims the benefit of International Application No. PCT/US2019/033104, filed on May 20, 2019, which claims priority to U.S. Provisional Application Ser. No. 62/848,314, filed on May 15, 2019. The disclosure of the prior application is considered part of and is incorporated by reference in the disclosure of this application.

BACKGROUND

Humans may engage in human-to-computer dialog with interactive software applications referred to herein as "automated assistants" (also referred to as "digital agents", "chatbots", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual interface output. Audible output can include synthesized speech rendered using one or more speakers. For example, an audio waveform can be determined for rendering as audible output.

SUMMARY

Implementations described herein are directed towards generating audio waveforms of synthesized speech by processing representations of text using an autoregressive neural network model. In several implementations, the autoregressive neural network model can be utilized by a text to speech (TTS) component of an automated assistant client in generating audio waveforms of synthesized speech. For example, a user can provide a request of "Turn on the kitchen light" to a computing system. The computing system, can determine text of "OK, turning on the light" as a response to the user's request (in addition to providing control signal(s) to a networked smart light). In a variety of implementations, the computing system can utilize an autoregressive model in determining a representation of an audio waveform of synthesized speech corresponding to the text of "OK, turning on the light", and can render the audio waveform as a response to the user. In many implementations, the amplitude, frequency, and/or other component of the audio waveform can change over time to reflect the changing sounds represented by the synthesized speech. A difference signal can be determined using the autoregressive model, where the difference signal represents the change in a current sample of the audio waveform from an immediately preceding sample of the audio waveform. For example, a first sample of an audio waveform can be represented by a first value at a first time, a second sample of the audio waveform can be represented by a second value at a second time, and a third sample of the audio waveform can be represented by a third value at a third time. A difference signal can be determined using the autoregressive model representing the change from the first value of the first sample of the audio waveform to the second value of the second sample of the audio waveform. An additional and/or alternative difference signal can be determined representing the change from the second value of the second sample of the audio waveform to the third value of the third sample of the audio waveform. The audio waveform can be rendered by sequentially rendering the samples of audio determined using a sequence of difference signals.

As described herein, generating difference signals utilizing the autoregressive model is efficient from the standpoint of processors and memory utilized in the processing. For example, the difference signal can be only N bits, but utilized to generate an M bit audio signal, where M is greater than N. Through utilization of a difference signal that is only N bits, less processing and/or memory resources can be utilized relative to, for example, generating the M bit audio signal itself as direct output utilizing an alternate autoregressive model. This efficiency can prolong battery life for client devices that utilize a battery, can enable effective TTS generation on client devices whose resources would otherwise be unable (under at least some situations, such as low power situations) to generate a full M bit audio signal as direct output using an autoregressive model. Moreover, the memory and processor efficiencies obtained by implementations described herein can also be impactful when TTS occurs at remote server(s), especially in situations where TTS generation is occurring in parallel for hundred(s) or thousand(s) of requests. For example, it can enable the remote server(s) to generate less heat and/or to free up capacity for handling more TTS requests and/or other processing.

In many implementations, the autoregressive model can be utilized in processing a variety of inputs including: a representation of at least a portion of text; an immediately preceding sample of the audio waveform; an immediately preceding difference signal; and/or additional input to generate a difference signal. This difference signal can be utilized, along with the immediately preceding sample of the audio waveform, to determine the next iteration of the audio waveform. To avoid error accumulation while generating the audio waveform, the model can reset itself (e.g., clear values from memory units) during pauses in speech, such as pauses between words, pauses between sentences (or other multi-word samples), and/or additional pauses in synthesized speech. For example, the model can be utilized in processing individual words: "OK", "turning", "on", "the", "light" as individual waveforms from provided text of "OK, turning on the light". As another example, the model can be utilized in generating synthesize speech for an entire textual news article, and can reset itself between sentences, paragraphs, and/or other multi-word samples of the news article. Resetting the model between pauses in the speech mitigates accumulation errors in the synthesized speech. In other words, accumulated error can be reduced by processing small representations (i.e., individual words, multi-word samples, and/or additional representations) of provided text.

Difference signals can be smaller than their equivalent representation of samples of raw audio waveforms. In many implementations, the compact size of a difference signal can enable determining a difference signal utilizing fewer system resources when compared to determining the corresponding portion of the audio waveform. As one example, a sample of a raw audio waveform can be represented using 16 bits, while a corresponding difference signal can be represented using 8 bits (256 potential difference signal values), 9 bits (512 potential difference signal values), and/or additional numbers of bit representations. This reduction in processing enables autoregressive models in accordance with many implementations to be utilized in efficiently generating audio waveforms under conditions where other models will fail. For example, a client device such as a cellular phone can have a low battery, one or more processors throttled by heat, and/or additional conditions. Similarly, one or more processors of a server can be throttle due to heat. In a variety of implementations, autoregressive models can be used in efficiently generating audio waveforms even under such conditions.

As described above, a difference signal represents the change between the current audio waveform sample and the immediately preceding audio waveform sample. In many implementations, the distribution of the difference signal can be uniform across all potential values. Additionally or alternatively, the distribution of the difference signal can be tailored to match an external distribution, such as the distribution of sounds in an external data set, a log uniform distribution, and/or additional signal distributions. Large changes in the audio waveform can be indicative of high amplitude and/or high frequency sounds, which are typically not found in human speech and/or are infrequently found in human speech (e.g., are found in human speech under a threshold value). Conversely, smaller changes in the audio data waveform are typically found in human speech and/or are found in human speech above a threshold value. In turn, the distribution of the difference signal can reflect the frequency of larger changes in the audio waveform compared to smaller changes by, for example, utilizing a distribution with more difference signal values reflecting smaller changes in the audio waveform and fewer difference signal values reflecting larger changes in the audio waveform not typically found in human speech.

Autoregressive models in accordance with several implementations can be trained using training instances which include training text (or representations of the training text), as well as a corresponding ground truth audio waveform corresponding to the training text. In many implementations, a training difference signal can be determined based on the difference between a sample of the audio waveform and the immediately preceding sample of the audio waveform. At least a portion of the training text, the immediately preceding sample of the ground truth audio waveform, and/or the training difference signal can be provided for processing by the autoregressive model. The model can be utilized to generate a predicted subsequent training difference signal. In many implementations, one or more weights of the network model can be updated based on a determined difference between a predicted difference signal and a corresponding difference signal determined from the ground truth audio data. Additionally or alternatively, the predicted difference signal can be combined with the immediately preceding sample of the audio waveform to determine a predicted audio waveform. One or more weights of the model can be updated based on a determined difference between the predicted audio waveform and a corresponding sample of the ground truth audio data.

In a variety of implementations, noise can be processed during model training to reduce errors in generated audio waveforms. For example, noise can be added to the ground truth audio data. Additionally or alternatively, noise can be injected directly into one or more portions of the model while training. For example, the noise can be injected into a portion of the model that is downstream from the input of the model, such as before or between one or more memory layers of the model (e.g., gated recurrent unit (GRU) layers or long short-term memory (LSTM) layers). For instance, the noise can be concatenated with input to be applied to a GRU layer during training. A variety of types of noise can be utilized while training autoregressive models in accordance with many implementations including: Gaussian noise, truncated Gaussian noise, random noise, and/or additional types of noise.

Accordingly, various implementations set forth techniques for processing textual input to generate synthesized speech corresponding to the text—and do so in a manner that enables generating the audio waveform to be more efficient through use of an autoregressive model in determining a difference signal. The autoregressive model can be used in generating synthesized speech despite a variety of computing system conditions. System resources (e.g., processor cycles, memory, battery power, and/or additional resources of a computing system) can be conserved by determining a smaller difference signal instead of determining a larger corresponding audio waveform. For example, a 16 bit sample of an audio waveform can be represented as an 8 bit difference signal. This substantial reduction of required system resources (e.g., a reduction of approximately half the required processor cycles) can enable an autoregressive model to be utilized in synthesizing speech on a client device despite a variety of computing system constraints on the processor(s). Synthesizing speech on a client device further reduces system resource usage by eliminating the need to transmit a request for an audio waveform from an additional computing device (e.g., a server). Furthermore, synthesizing speech on a client device can speed up the rendering process by eliminating delay(s) caused by transmitting a request for an audio waveform to a server and/or receiving the audio waveform from the server.

Other implementations may include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
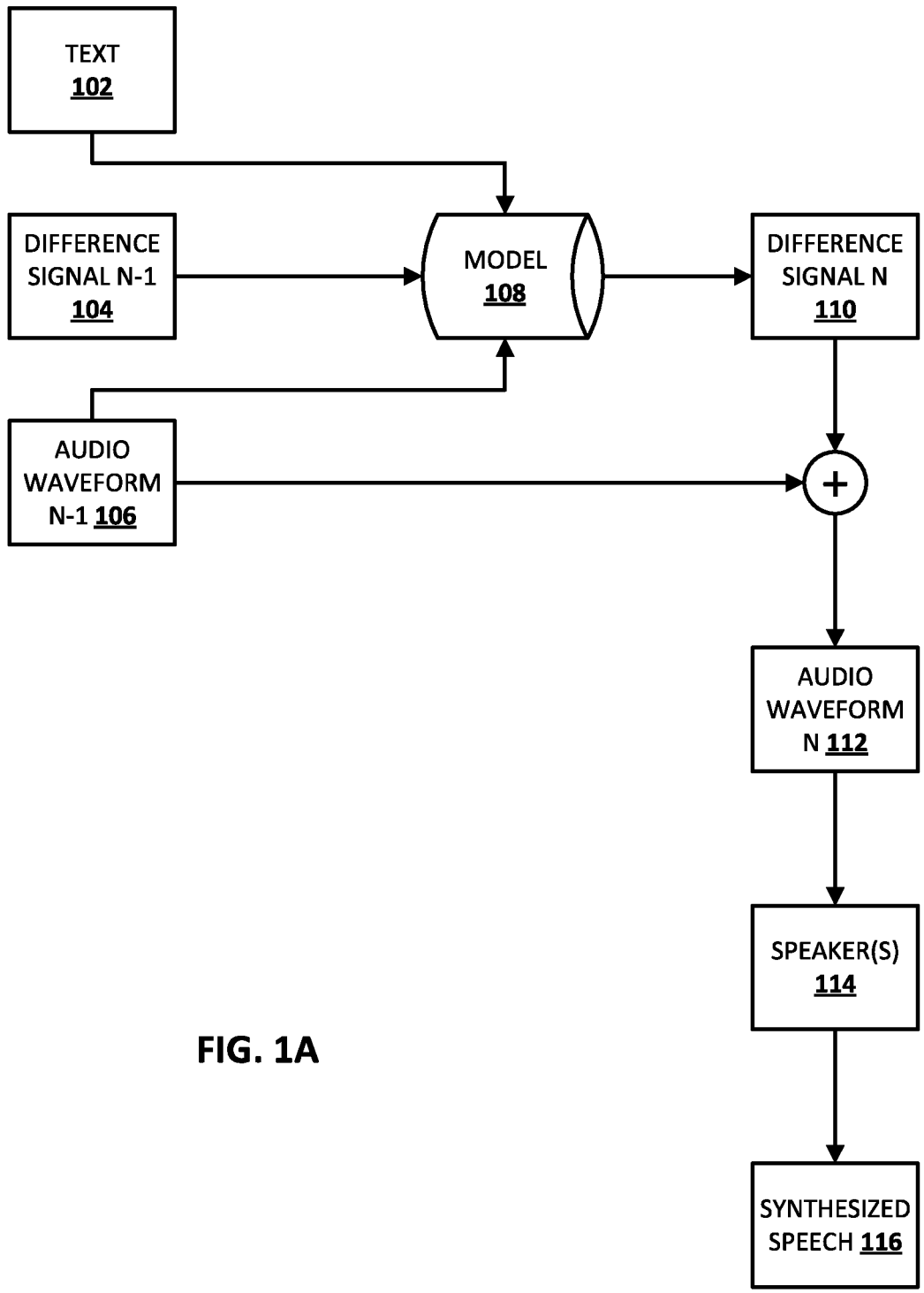
FIG. 1A illustrates an example of generating synthesized speech in accordance with various implementations disclosed herein.

FIG. 1A illustrates determining synthesized speech from provided text according to implementations disclosed herein. In many implementations, a system can determined the text as a response to a request from a user. For example, a text to speech client of an automated assistant can determined "OK, turning the temperature up by five degrees" is responsive to a user request of "Assistant, turn the temperature up five degrees". The system can determined text 102 of "OK, turning the temperature up five degrees". In a variety of implementations, an autoregressive model 108 can be utilized to process text 102 to determine a difference signal N 110, which in turn can be utilized to generated synthesized speech 116.

Model 108 can be utilized in determining difference signal N 110 (corresponding to time N) based on at least a portion of text 102, difference signal N-1 104, and audio waveform N-1 106. In some such implementations, difference signal N-1 104 and audio waveform N-1 106 can correspond to an immediately preceding iteration at time N-1. In many implementations, at a first iteration, the system can utilize a difference signal N-1 104 and/or an audio waveform N-1 106 corresponding to a zero value, an empty value, and/or an additional initialization value. Moreover, once generated, difference signal N 110 can be combined with the immediately preceding audio waveform N-1 106 to determine audio waveform N 112. In other words, model 108 can be utilized in determining the change in the audio waveform from the preceding iteration to the current iteration.

Audio waveform N 112 can be rendered using one or more speakers 114 to generate synthesized speech 116. Additionally or alternatively, samples of the audio waveform, such as sample of the audio waveform N-1 106, sample of the audio waveform N 112, and/or additional samples of the audio waveform can be rendered sequentially using speaker(s) 114 to generate synthesized speech 116.

Figure 1B:
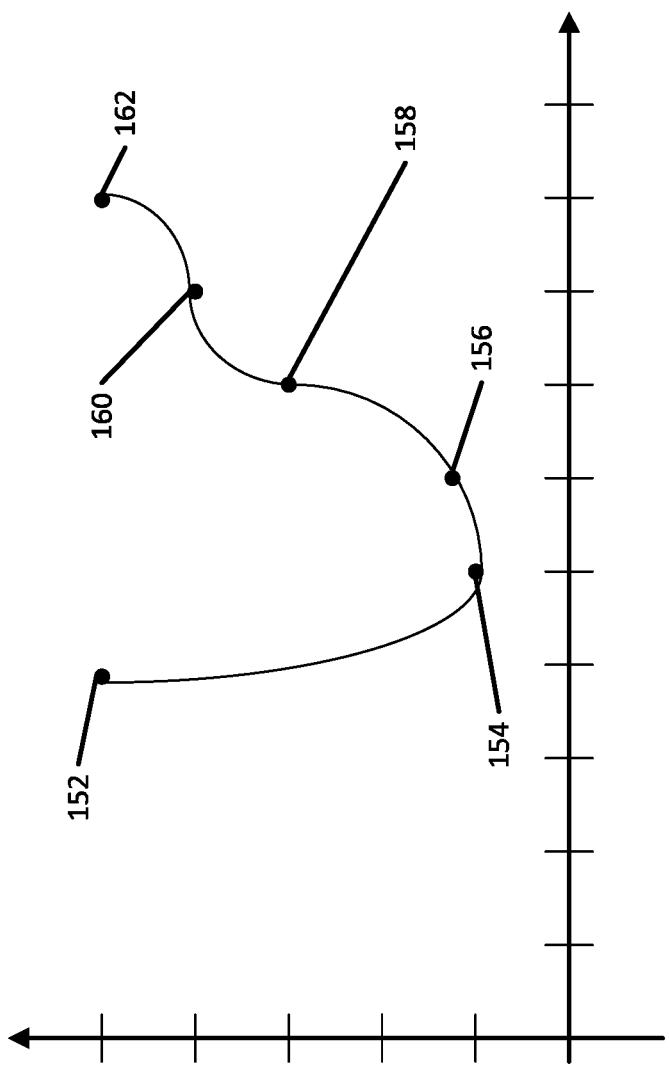
FIG. 1B illustrates an audio waveform in accordance with various implementations disclosed herein.

FIG. 1B illustrates an audio waveform in accordance with implementations described herein. As one example, points 152, 154, 156, 158, 160, and 162 are indicated as a series of points along the audio waveform. The difference between point 152 and 154 has an absolute value of 4. In other words, an autoregressive model could determine a difference signal of −4, absolute value 4, and/or other values corresponding to the change from point 152 to point 154. In many implementations, the same value difference signal can result in different sounds in the audio waveform. For example, the difference between points 158 and 160 has a value of 1. Additionally, the difference between points 160 and 162 has a value of one. While both these differences have the same value, the sound representing these points will be different.

Audio waveforms generated in accordance with a variety of implementations are a lossy representation. As an example, the difference between points 154 and 156 on the waveform has a slight change. However, in many implementations, the system can determine a difference signal value corresponding to the closest value in distribution of difference signal values. Thus, the change between point 154 and 156 can be represented as a zero value. Additional or alternative implementations can represent a variety of difference signal distributions. These distributions can be selected to represent sounds more frequently found in human speech on a more granular level, while representing sounds infrequently found or not found in human speech at a less granular level. Typically, human speech rarely contains high amplitude and/or high frequency sounds which correspond to large difference signal values. Thus, the distribution of values of the difference signal can be focused on small changes in the audio waveform corresponding with low difference signal values, and conversely can contain few values corresponding to large changes. As an example, a difference signal distribution can include values corresponding to 1, 2, 4, 8, 16, 32, and 64. In the illustrated example, half the range of 1 to 64 is represented by most of the difference signal values. Representing all the changes in the audio waveform from 32 to 64 as a single difference signal value will not have much or any impact on the resulting audio waveform if these large changes in sounds are not represented by human speech.

In many implementations, each sample of the audio waveform can be represented using 16 bits. Difference signal distributions corresponding with this audio waveform sample can be constructed such that the difference signal is selected from 256 discrete values (i.e. 8 bits), 512 discrete values (i.e., 9 bits), and/or additional numbers of discrete values smaller than a 16 bit representation. System resources can be conserved by determining an 8 bit difference signal in place of directly determining a 16 bit audio waveform sample. This reduction in processing enables autoregressive models in accordance with many implementations to be utilized in efficiently generating audio waveforms under conditions where other models will fail. For example, a client device such as a cellular phone can have a low battery, one or more processors throttled by heat, and/or additional conditions. Similarly, one or more processors of a server can be throttle due to heat. In a variety of implementations, autoregressive models can be used in efficiently generating audio waveforms even under such conditions.

Figure 2:
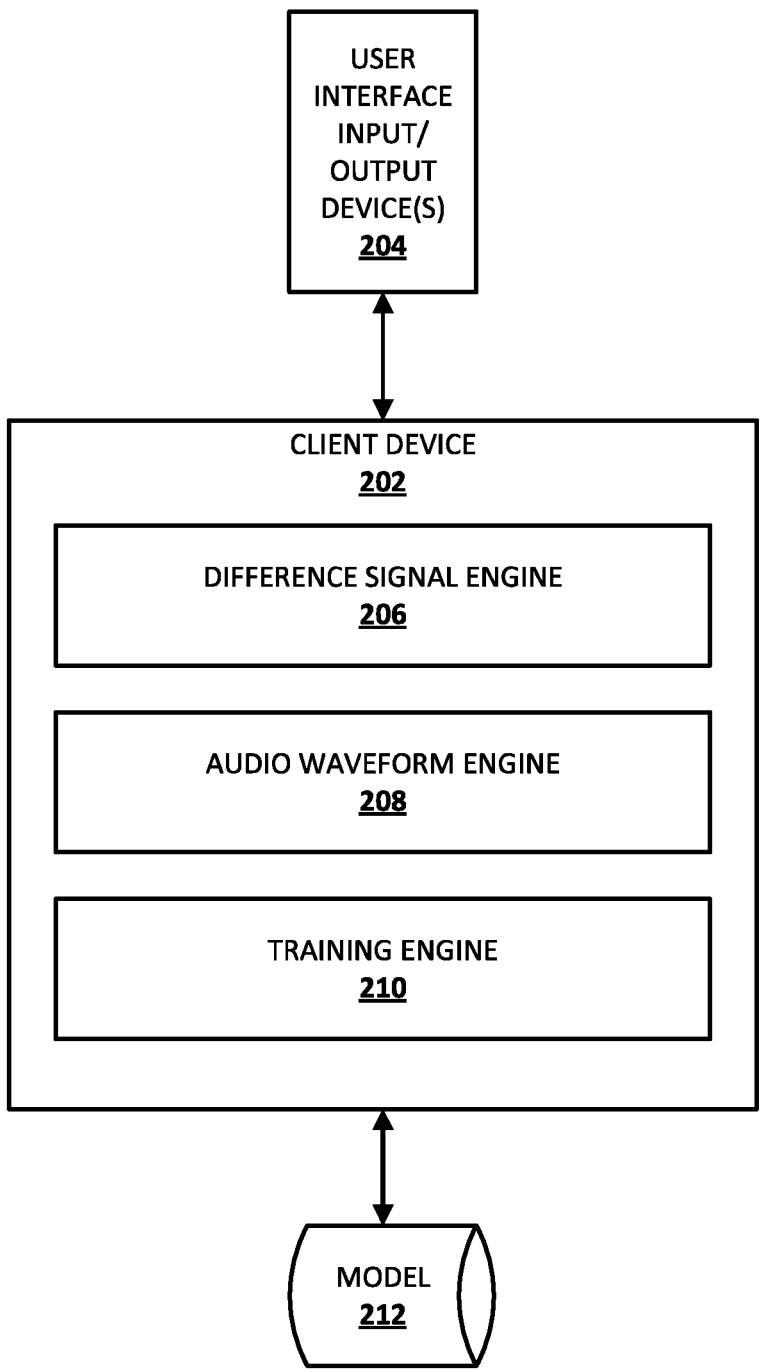
FIG. 2 illustrates an example environment where various implementations disclosed herein can be implemented.

FIG. 2 illustrates an example environment in which implementations disclosed herein may be implemented. The example environment of FIG. 2 includes client device 202 and one or more user interface input/output devices 204. Additionally or alternatively, client device 202 may be associated with model(s) 212 such as one or more autoregressive models for synthesizing speech based on provided text. Client device 202 can include difference signal engine 206, audio waveform engine 208, training engine 210, and/or additional or alternative engines (not depicted). In many implementations, model 212 can be a neural network model such as a recurrent neural network model, a convolutional neural network model, a feed forward neural network model, and/or additional types of network models. Additionally or alternatively, model 212 can be a combination of several types of neural network models. As an illustrative example, model 212 can be a recurrent neural network model which can include stack(s) of unidirectional recurrent network layers and/or stack(s) of bi-directional recurrent network layers. Recurrent network layers can each include one or more memory units to which input can be sequentially applied and, at each iteration of applied input, the memory unit(s) can be utilized to calculate a new hidden state based on the input of the iteration and based on a current hidden state (that can be based on input(s) of prior iteration(s)). In some implementations, a memory unit can be a long short-term memory (LSTM) unit. In some implementations, additional or alternative memory unit(s) may be utilized such as a gated recurrent unit (GRU).

The user interface input/output devices 204 may include, for example, a physical keyboard, a touch screen (e.g., implementing a virtual keyboard or other textual input mechanism), a microphone, and/or a camera, a display screen and/or speaker(s). The user interface input/output devices 204 may be incorporated with one or more client devices 202 of a user. For example, a mobile phone of the user may include the user interface input/output devices 204; a standalone personal assistant hardware device may include the user interface input/output devices 204; or a first computing device may include the user interface input device(s) 204 and a separate computing device may include the user interface output device(s) 204; etc.

Although client device 202 is illustrated in FIG. 2 as separate from the user interface input/output devices 204, in some implementations, all or aspects of client device 202 may be implemented on a client device that also contains the user interface input/output device(s) 204. In some implementations, client device 202 may include an automated assistant (not depicted), and all or aspects of the automated assistant may be implemented on a computing device(s) that are separate and remote from the client device that contains the user interface input/output device(s) 204 (e.g., all or aspects may be implemented "in the cloud"). In some of those implementations, those aspects of the automated assistant may communicate with the computing device via one or more networks such as a local area network (LAN) and/or a wide area network (WAN) (e.g., the internet).

Some non-limiting examples of client device 202 that may include the user interface input/output device(s) 204 include one or more of: a desktop computing device, a laptop computing device, a standalone hardware device at least in part dedicated to an automated assistant, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided.

Client device 202 may include one or more memories for storage of data and software applications, one or more processors for accessing data and executing applications, and other components that facilitate communication over a network. The operations performed by client device 202 may be distributed across multiple computing devices. For example, computing programs running on one or more computers in one or more locations can be coupled to each other through a network.

As illustrated in FIG. 2, client device 202 can process provided text (not depicted) utilizing model 212 to generate a difference signal representing the difference between a current iteration of an audio waveform and an immediately preceding iteration of the audio waveform. The audio waveform can be rendered using user interface output device(s) 204 such as one more speakers to generate synthesized speech for a user of the client device.

Difference signal engine 206 can utilize model 212 in determining a difference signal for a current iteration. In many implementations, difference signal engine 206 can process at least a portion of text, the preceding iteration of the audio waveform, and the preceding difference signal for processing utilizing model 212. In many implementations, provided text can be determined using an additional engine, such as one or more engines of an automated assistant client (not depicted). To reduce accumulation errors, the system can process smaller portions of the provided text, such as separating portions of the text based on natural pauses in the synthesized speech. For example, in system can process individual words of the phrase "OK, turning on the kitchen lights" sequentially using the model. Additionally or alternatively, the system can process individual phonemes which represent the provided text sequentially using the model.

Audio waveform engine 208 can determine a sample of the audio waveform based on a previous sample of the audio waveform and the difference signal for the current iteration determined using difference signal engine 206. Determining a difference signal and a corresponding audio waveform is described below with respect to process 400 of FIG. 4 and process 500 of FIG. 5.

Training engine 210 can be utilized to train model 212. Training an autoregressive model is described below with respect process 300 to FIG. 3. In many implementations, noise can be injected into model 212 during training, to make the model more robust with a lower error in the resulting difference signals (and thus a lower error in the resulting audio waveforms). As an example, when model 212 is a recurrent neural network model, noise can be injected directly into one or more memory units downstream from the input. Injected noise can be a variety of types of noise including Gaussian noise, truncated Gaussian noise, and/or other types of noise.

Figure 3:
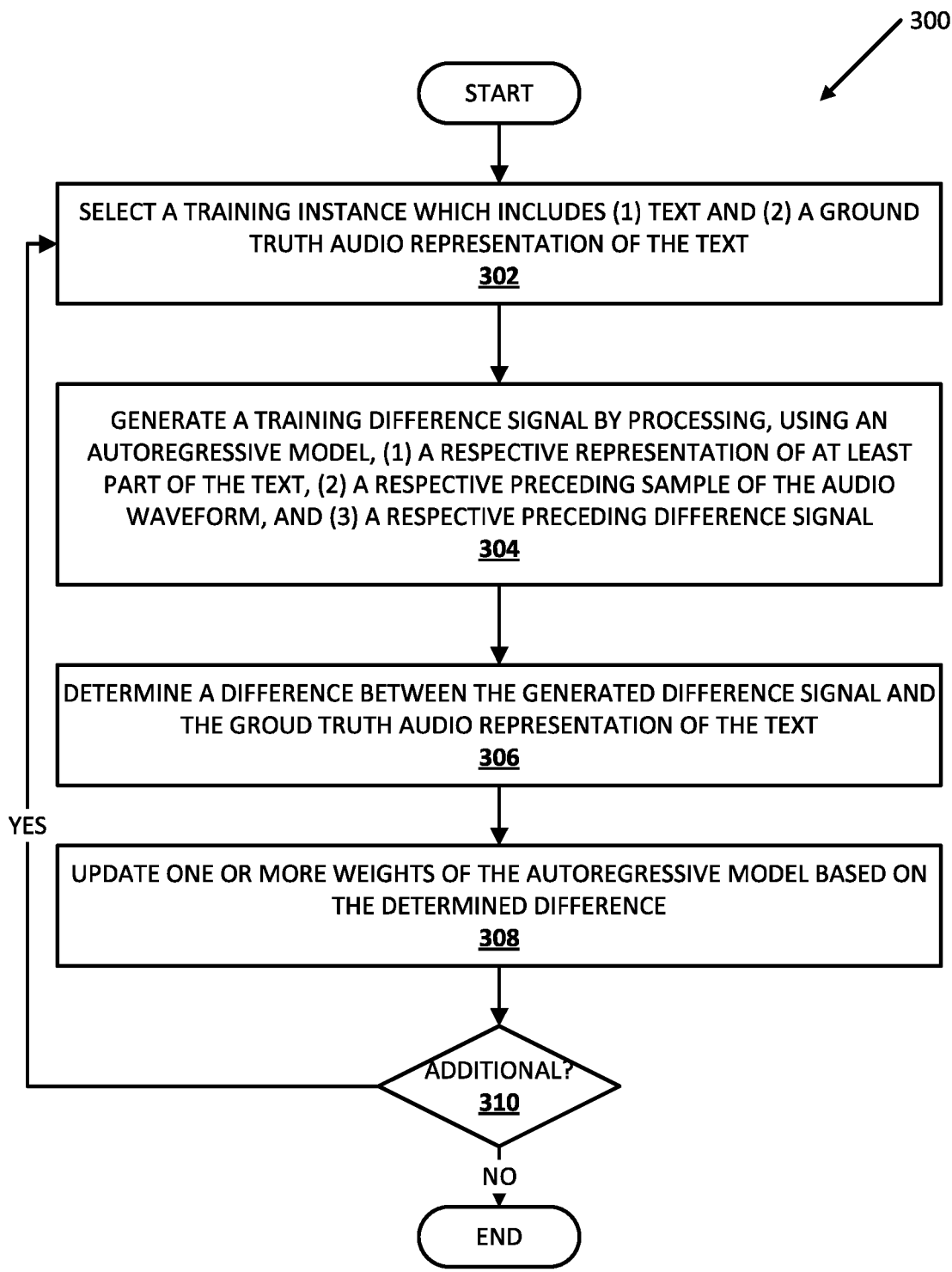
FIG. 3 is a flowchart illustrating an example process of training an autoregressive model in accordance with implementations disclosed herein.

FIG. 3 is a flowchart illustrating an example process 300 of training an autoregressive model for generating difference signal(s) according to implementations disclosed herein. For convenience, the operations of the flowchart are described with reference to a system that performs the operations. This system may include various components of various computer systems, such as one or more components of client device 202 of FIG. 2. Moreover, while operations of process 300 are shown in a particular order, this is not meant to be limiting. One or more operations may be reordered, omitted, and/or added.

At block 302, the system selects a training instance. In many implementations, the training instance includes (1) text and (2) a ground truth audio representation of the text. For example, a training instance can include the text of "OK, turning off all lights" as well as a corresponding ground truth audio of a person speaking "OK, turn off all the lights".

At block 304, the system generates a training difference signal by processing, using an autoregressive model, (1) a respective representation of at least part of the text; (2) a respective preceding sample of the audio wave; and (3) a respective preceding difference signal. For example, the system can process individual portions of the spoken text, and the respective representation of the text can be the individual portion such as individual words, individual phonemes, and/or additional representations of the text. When the system is at the first iteration, the system can select an initialization value, such as a value corresponding to zero, for the respective preceding sample of the audio waveform and the respective preceding difference signal.

At block 306, the system determines a difference between the generated difference signal and the ground truth audio representation of the text. In many implementations, this difference can be determined based on the difference between the generated difference signal and a difference signal determined from the ground truth audio representation of the text. Additionally or alternatively, the generated difference signal can be utilized to determine a respective iteration of a predicted audio waveform, and the difference can be determined by comparing the predicted audio waveform to the ground truth audio waveform.

At block 308, the system updates one or more weights of the autoregressive model based on the determined difference. For instance, the system can update weights of the machine learning model by backpropagation of an error that is based on the determined difference.

At block 310, the system determines whether to select an additional training instance. If so, the system proceeds back to block 302, selects a different training instance, and proceeds to blocks 304, 306, and 308. In some implementations, the system can determine to select an additional training instance if there are one or more unprocessed training instances and/or if other criterion/criteria are not yet satisfied. The other criterion/criteria can include, for example, whether a threshold number of epochs have occurred and/or a threshold duration of training has occurred. Although process 300 is described with respect to a non-batch learning technique, batch learning may additionally and/or alternatively be utilized. If, at an iteration of block 310, the system determines not to select an additional training instance, the process 300 ends.

Figure 4:
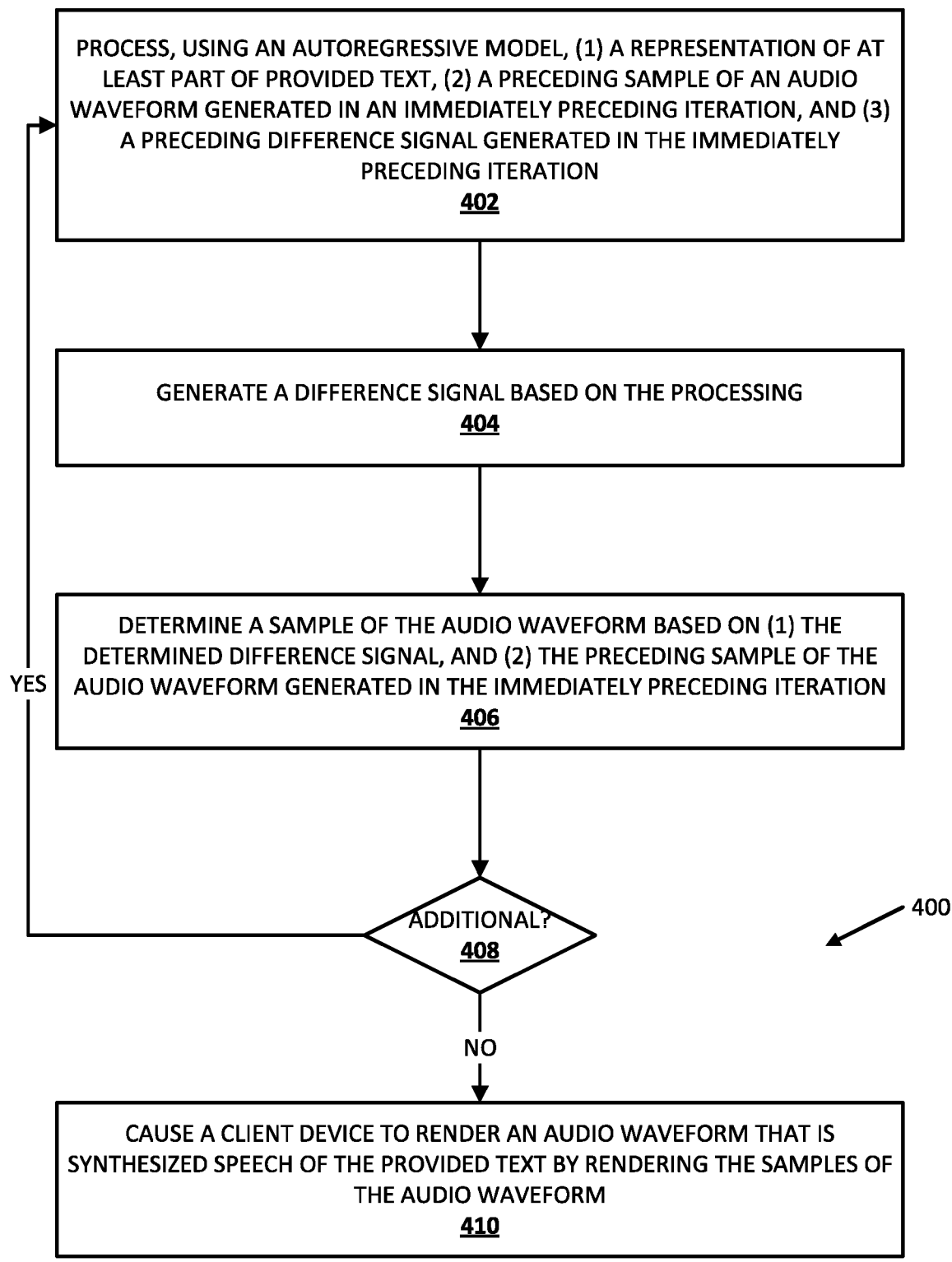
FIG. 4 is a flowchart illustrating an example process of generating an audio waveform from a difference signal determined using an autoregressive model in accordance with implementations disclosed herein.

FIG. 4 is a flowchart illustrating an example process 400 of generating an audio waveform from a difference signal determined at a client device using an autoregressive model according to implementations disclosed herein. For convenience, the operations of the flowchart are described with reference to a system that performs the operations. This system may include various components of various computer systems, such as one or more components of client device 202 of FIG. 2. Moreover, while operations of process 400 are shown in a particular order, this is not meant to be limiting. One or more operations may be reordered, omitted, and/or added.

At block 402, the system processes, using an autoregressive model, (1) a representation of at least part of provided text; (2) a preceding sample of an audio waveform generated in an immediately preceding iteration; and (3) a preceding difference signal generated in the immediately preceding iteration. At a first iteration, the system can process an empty value, a zero value, and/or another initialization value in place of the preceding sample of the audio waveform and/or the preceding difference signal. In many implementations, the system processes the provided input using an autoregressive model stored locally at a client device.

At block 404, the system generates a difference for the current iteration based on the processing at block 402.

At block 406, the system determines a sample of the audio waveform for the current iteration based on (1) the difference signal determined at block 404 and (2) the preceding sample of the audio waveform generated in the immediately preceding iteration.

At block 408, the system determines whether to process additional portions of the provided text. If so, the system selects an additional representation of the provided text, and proceeds back to block 402 to process the provided text, the sample of the audio waveform generated at block 406, and the difference signal generated at block 404 using the autoregressive model.

If the system determines to not process additional portion(s) of the provided text, at block 410, the system causes a client device to render an audio waveform that is synthesized speech of the provided text by sequentially rendering the samples of the audio waveform using one or more speakers.

Figure 5:
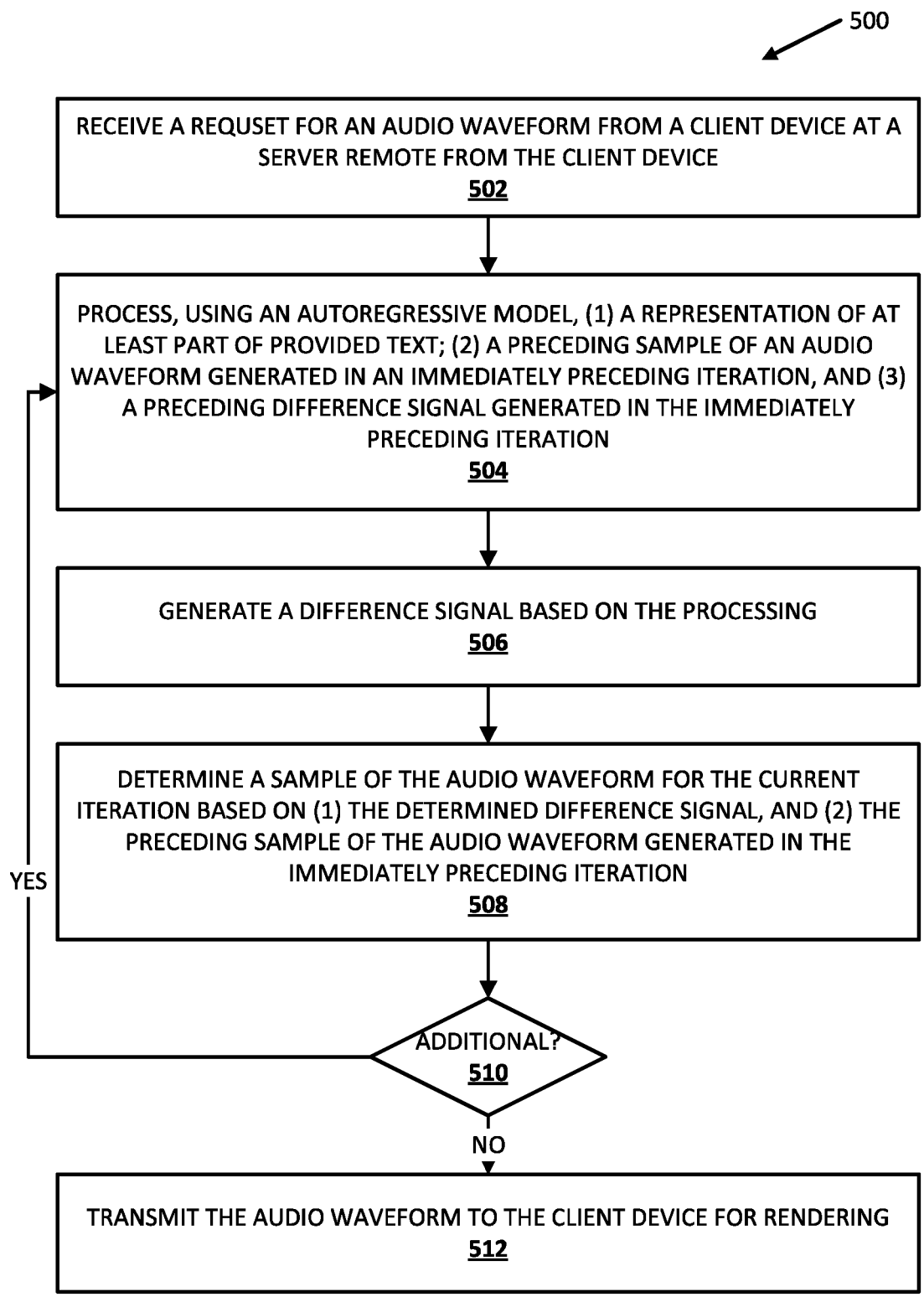
FIG. 5 is a flowchart illustrating another example process of generating an audio waveform from a difference signal determined using an autoregressive model in accordance with implementations disclosed herein.

FIG. 5 is a flowchart illustrating another example process 500 of generating an audio waveform from a difference signal determined using an autoregressive model at a server remote from a client device according to implementations disclosed herein. For convenience, the operations of the flowchart are described with reference to a system that performs the operations. This system may include various components of various computer systems, such as one or more components of client device 202 of FIG. 2. Moreover, while operations of process 500 are shown in a particular order, this is not meant to be limiting. One or more operations may be reordered, omitted, and/or added.

At block 502, a server receives a request for an audio waveform from a client device, where the server is remote from the client device. In some implementations, the server can receive the provided text from the client device. In other implementations, the server can receive a representation of user interface input from the client device, and the server can determine the text to provide as a response to the user. For example, one or more cloud based components of an automated assistant client can determine text responsive to a user.

At block 504, the system processes, using an autoregressive model (1) a representation of at least part of the provided text; (2) a preceding sample of an audio waveform generated in an immediately preceding iteration; and (3) a preceding difference signal generated in the immediately preceding iteration.

At block 506, the system generates a difference signal for the current iteration based on the processing at block 504.

At block 508, the system determines a sample of the audio waveform for the current iteration based on (1) the difference signal determined at block 506, and (2) the preceding sample of the audio waveform generated in the immediately preceding iteration.

At block 510, the system determined whether to process additional portions(s) of the provided text. If so, the system selects an additional portion of the provided text and proceeds back to block 504, where the system processes (1) the representation of the additional portion of the provided text; (2) the sample of the audio waveform generated at block 508; and (3) the difference signal generated at block 506 using the autoregressive model, before proceeding to blocks 506, and 508.

If not, at block 512, the system transmits the audio waveform to the client device for rendering. For example, the client device can render the audio waveform as synthesized speech using one or more speakers of the client device.

Figure 6:
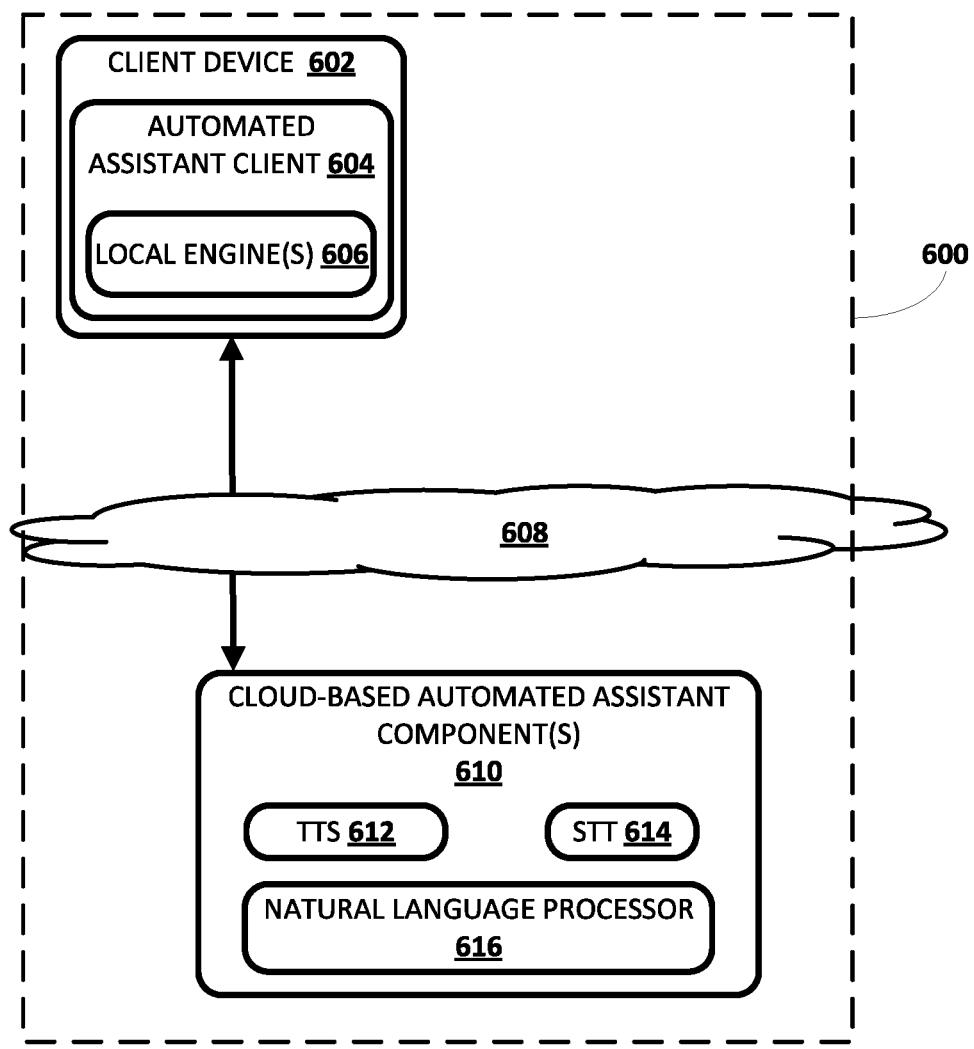
FIG. 6 illustrates another example environment in which implementations disclosed herein can be implemented.

Turning to FIG. 6, an example environment in which implementations disclosed herein can be implemented. FIG. 6 includes a client computing device 602, which execute an instance of an automated assistant client 604. One or more cloud-based automated assistant components 610 can be implemented on one or more computing systems (collectively referred to as a "cloud" computing system) that are communicatively coupled to client device 602 via one or more local and/or wide area networks (e.g., the Internet) indicated generally at 608.

An instance of an automated assistant client 604, by way of its interactions with one or more cloud-based automated assistant components 610, may form what appears to be, from the user's perspective, a logical instance of an automated assistant 600 with which the user may engage in a human-to-computer dialog. It thus should be understood that in some implementations, a user that engages with an automated assistant client 604 executing on client device 602 may, in effect, engage with his or her own logical instance of an automated assistant 600. For the sakes of brevity and simplicity, the term "automated assistant" as used herein as "serving" a particular user will often refer to the combination of an automated assistant client 604 executing on a client device 602 operated by the user and one or more cloud-based automated assistant components 610 (which may be shared amongst multiple automated assistant clients of multiple client computing devices). It should also be understood that in some implementations, automated assistant 600 may respond to a request from any user regardless of whether the user is actually "served" by that particular instance of automated assistant 600.

The client computing device 602 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 602 may be distributed between multiple computing devices. For example, one or more operations of client computing device 602 may be distributed between a mobile smartphone and a vehicle computing device. Furthermore, operations of client computing device 602 may be repeated between multiple computing devices (which in some cases may be communicatively coupled). As a further example, a mobile smartphone as well as a vehicle interface device may each implement operations of automated assistant 600, such as a mobile smartphone and a vehicle interface device both including an invocation engine (described below). In various implementations, the client computing device 602 may optionally operate one or more other applications that are in additional to automated assistant client 604, such as a message exchange client (e.g., SMS, MMS, online chat), a browser, and so forth. In some of those various implementations, one or more of the other applications can optionally interface (e.g. via an application programming interface) with the automated assistant 604, or include their own instance of an automated assistant application (that may also interface with the cloud-based automated assistant component(s) 610).

Automated assistant 600 engages in human-to-computer dialog sessions with a user via user interface input and output devices of the client device (not pictured). To preserve user privacy and/or to conserve resources, in many situations a user must often explicitly invoke the automated assistant 600 before the automated assistant will fully process a spoken utterance. The explicit invocation of the automated assistant 600 can occur in response to certain user interface input received at the client device 602. For example, user interface inputs that can invoke the automated assistant 600 via the client device 602 can optionally include actuations of a hardware and/or virtual button of the client device 602. Moreover, the automated assistant client can include one or more local engines 606, such as an invocation engine that is operable to detect the presence of one or more spoken invocation phrases. The invocation engine can invoke the automated assistant 600 in response to detection of one or more of the spoken invocation phrases. For example, the invocation engine can invoke the automated assistant 600 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 600. As used herein, "invoking" the automated assistant 600 can include causing one or more previously inactive functions of the automated assistant 600 to be activated. For example, invoking the automated assistant 600 can include causing one or more local engines 606 and/or cloud-based automated assistant components 610 to further process audio data frames based on which the invocation phrase was detected, and/or one or more following audio data frames (whereas prior to invoking no further processing of audio data frames was occurring).

The one or more local engine(s) 606 of automated assistant 604 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 602 is relatively constrained in terms of computing resources (e.g., processor cycles, memory, battery, etc.), the local engines 606 may have limited functionality relative to any counterparts that are included in cloud-based automated assistant components 610.

Automated assistant client 604 can additionally include a content agent engine (not pictured) which can be utilized by automated assistant client 604 in accordance with a variety of implementations including: generating a content agent, determining content related to a user request using a content agent, determining content using a content agent without receiving a user request, etc.

Cloud-based automated assistant components 610 leverage the virtually limitless resources of the cloud to perform more robust and/or more accurate processing of audio data, and/or other user interface input, relative to any counterparts of the local engine(s) 606. Again, in various implementations, the client device 602 can provide audio data and/or other data to the cloud-based automated assistant components 610 in response to the invocation engine detecting a spoken invocation phrase, or detecting some other explicit invocation of the automated assistant 600.

The illustrated cloud-based automated assistant components 610 include a cloud-based TTS module 612, a cloud-based STT module 614, and a natural language processor 616. In some implementations, one or more of the engines and/or modules of automated assistant 600 may be omitted, combined, and/or implemented in a component that is separate from automated assistant 600. Further, in some implementations automated assistant 600 can include additional and/or alternative engines and/or modules.

Cloud-based STT module 614 can convert audio data into text, which may then be provided to natural language processor 616. In various implementations, the cloud-based STT module 614 can covert audio data into text based at least in part on indications of speaker labels and assignments that are provided by an assignment engine (not illustrated).

Cloud-based TTS module 612 can convert textual data (e.g., natural language responses formulated by automated assistant 600) into computer-generated speech output. In some implementations, TTS module 612 may provide the computer-generated speech output to client device 602 to be output directly, e.g., using one or more speakers. In other implementations, textual data (e.g., natural language responses) generated by automated assistant 600 may be provided to one of the local engine(s) 606, which may then convert the textual data into computer-generated speech that is output locally.

Natural language processor 616 of automated assistant 600 processes free form natural language input and generates, based on the natural language input, annotated output for use by one or more other components of the automated assistant 600. For example, the natural language processor 616 can process natural language free-form input that is textual input that is a conversion, by STT module 614, of audio data provided by a user via client device 602. The generated annotated output may include one or more annotations of the natural language input and optionally one or more (e.g., all) of the terms of the natural language input. In some implementations, the natural language processor 616 is configured to identify and annotate various types of grammatical information in natural language input. For example, the natural language processor 616 may include a part of speech tagger (not depicted) configured to annotate terms with their grammatical roles. Also, for example, in some implementations the natural language processor 616 may additionally and/or alternatively include a dependency parser (not depicted) configured to determine syntactic relationships between terms in natural language input.

In some implementations, the natural language processor 616 may additionally and/or alternatively include an entity tagger (not depicted) configured to annotate entity references in one or more samples such as references to people (including, for instance, literary characters, celebrities, public figures, etc.), organizations, locations (real and imaginary), and so forth. The entity tagger of the natural language processor 616 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 616 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 616 may rely on annotations from one or more other components of the natural language processor 616. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 616 may use related prior input and/or other related data outside of the particular natural language input to determine one or more annotations.

Figure 7:
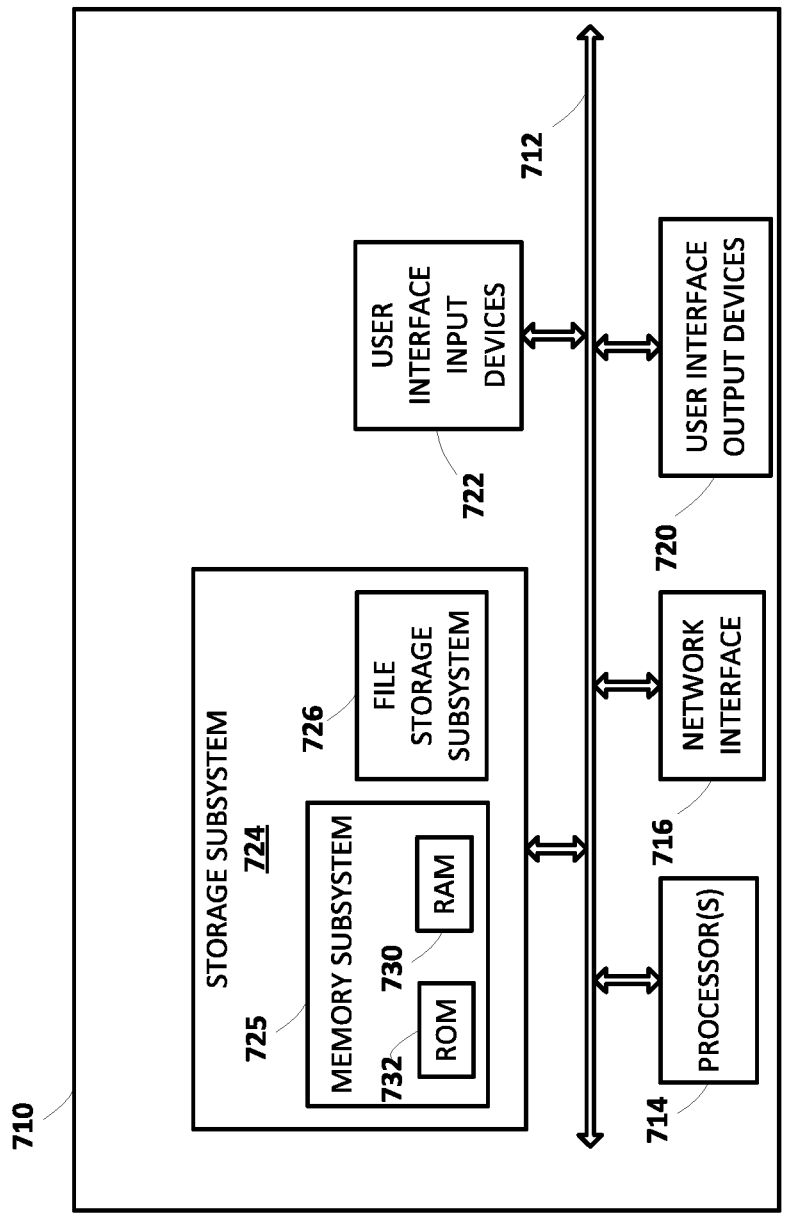
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 3, FIG. 4 and/or FIG. 5, as well as to implement various components depicted in FIG. 2.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes generating an audio waveform that is synthesized speech of provided text. In some implementations, generating the audio waveform further includes, at each iteration of a plurality of sequential iterations of generating samples of the audio waveform, processing input using an autoregressive model. In some implementations, the input further includes a respective representation of at least part of the provided text, a respective preceding sample, of the samples of the audio waveform, the respective preceding sample generated in an immediately preceding iteration of the sequential iterations, and a respective preceding difference signal generated in the immediately preceding iteration. The method further includes, generating, for the iteration and based on the processing, a difference signal for the iteration. The method further includes determining a respective sample for the iteration using the difference signal for the respective iteration and the respective preceding sample of the audio waveform generated in the immediately preceding iteration, the respective sample for the iteration being one of the samples of the audio waveform. The method further includes causing a client device to render the audio waveform by rendering the samples of the audio waveform.

These and other implementations of the technology disclosed herein can include one or more of the following features.

In some implementations, the one or more processors are one or more processors of the client device, wherein the client device includes memory and one or more speakers, wherein the autoregressive model is stored in the memory, wherein the audio waveform is generated using one or more of the processors of the client device, and wherein the audio waveform is rendered using one or more of the speakers of the client device. In some versions of those implementations, the method further includes determining that one or more conditions of the client device are satisfied. In response to determining that one or more conditions are satisfied, the method further includes determining to utilize the autoregressive model to generate the audio waveform based on difference signals generated using the autoregressive model, instead of utilizing an alternative autoregressive model that is more resource intensive to utilize than the autoregressive model. In some versions of those implementations, the one or more conditions of the client device include the client device being powered by a battery which is not fully charged. In some versions of those implementations, the one or more conditions of the client device include the one or more of the processors of the client device being throttled by heat.

In some implementations, the computing system includes a server remote from the client device, wherein the server includes a memory, wherein the one or more processors are one or more processors of the server, wherein the autoregressive model is stored in the memory of the server, wherein the audio waveform is generated using one or more of the processors of the server, and wherein causing the client device to render the audio waveform comprises transmitting the samples of the audio waveform to the client device. In some versions of those implementations, the method further includes determining that one or more conditions of the server are satisfied. In response to determining that one or more conditions are satisfied, the method further includes determining to utilize the autoregressive model to generate the audio waveform based on difference signals generated using the autoregressive model, instead of utilizing an alternative autoregressive model that is more resource intensive to utilize than the autoregressive model. In some versions of those implementations, the one or more conditions of the server include one or more of the processors of the server being throttled by heat.

In some implementations, the autoregressive model is a recurrent neural network model.

In some implementations, the difference signal generated for the iteration is a smaller number of bits than a number of bits for the respective sample of the audio waveform of the iteration.

In some implementations, the difference signal is a discrete value selected from a difference signal distribution. In some versions of those implementations, the difference signal distribution is a log uniform distribution. In some versions of those implementations, the difference signal distribution includes 256 discrete values or 512 discrete values. In some version of those implementations, the difference signal distribution includes at least a first difference signal value and a second difference signal value, wherein the first difference signal value represents a change in sound corresponding to a high amplitude high frequency sound not found in human speech, or found in human speech with less than a threshold frequency, wherein the second difference signal value represents a change is sound found in human speech, or found in human speech with greater than a threshold frequency, and wherein the change in sound represented by the first difference signal is greater than the change in sound represented by the second difference signal. In some versions of those implementations, the difference signal distribution excludes a difference signal value representing a high amplitude high frequency sound not found in human speech, or found in human speech with less than a threshold frequency.

In some implementations, the audio waveform comprises synthesized speech of provided text representing an individual word.

In some implementations, the audio waveform comprises synthesized speech of provided text representing an individual phoneme.

In some implementations, the method further includes training the autoregressive model using a speech synthesis training instance including provided training text and a ground truth audio waveform corresponding to the provided training text. In some versions of those implementations, wherein training the autoregressive model further includes, at each iteration of a plurality of sequential training iterations of generating samples of a training audio waveform, processing, provided input using the autoregressive model. In some versions of those implementations, the provided input further includes a respective representation of at least part of the provided training text, a respective preceding training sample, of the samples of the training audio waveform, the respective preceding training sample generated in an immediately preceding iteration of the sequential training iterations, and a respective preceding training difference signal generated in the immediately preceding iteration. The method further includes, generating, for the iteration and based on the processing, a training difference signal for the iteration. The method further includes determining a respective training sample for the iteration using the difference signal for the respective iteration and the respective preceding training sample of the audio waveform generated in the immediately preceding iteration, the respective training sample for the iteration being one of the samples of the audio waveform. The method further includes determining a difference between the respective training sample for the iteration and the corresponding sample of the ground truth audio waveform. The method further includes updating one or more weights of the autoregressive model based on the determined difference.

In some implementations, the computing system includes an automated assistant client.

In some implementations, a method implemented by one or more processors is provided that includes training an autoregressive model for synthesizing speech using a speech synthesis training instance, wherein the training instance includes provided training text and a ground truth audio waveform corresponding to the provided training text. In some implementations, training the autoregressive model includes, at each iteration of a plurality of sequential training iterations of generating samples of a training audio waveform, processing provided input, using the autoregressive model. In some implementations, the provided input includes a respective representation of at least part of the provided training text, a respective preceding training sample, of the samples of the training audio waveform, the respective preceding training sample generated in an immediately preceding iteration of the sequential training iterations, and a respective preceding training difference signal generated in the immediately preceding iteration. The method further includes, generating, for the iteration and based on the processing, a training difference signal for the iteration. The method further includes determining a respective training sample for the iteration using the difference signal for the respective iteration and the respective preceding training sample of the audio waveform generated in the immediately preceding iteration, the respective training sample for the iteration being one of the samples of the audio waveform. The method further includes determining a difference between the respective training sample for the iteration and the corresponding sample of the ground truth audio waveform.

The method further includes updating one or more weights of the autoregressive model based on the determined difference.

These and other implementations of the technology disclosed herein can include one or more of the following features.

In some implementations, training the autoregressive model further includes injecting a noise signal into the autoregressive model downstream from an input layer of the model and upstream from one or more memory layers of the model. In some versions of those implementations, the one or more memory layers of the model are one or more gated recurrent units, or the one or more memory layers of the model are one or more long short term memory units. In some versions of those implementations, the noise signal is truncated Gaussian noise.

In some implementations, a client device including one or more processors, one or more speakers, and a memory storing an autoregressive model is provided. The client device further includes the one or more processors are configured to execute instructions that cause the computing system to generate an audio waveform that is synthesized speech of provided text. In some implementations, generating the audio waveform includes, at each iteration of a plurality of sequential iterations of generating samples of the audio waveform, processing respective input, using the autoregressive model. In some implementations, the respective input includes a respective representation of at least part of the provided text, a respective preceding sample, of the samples of the audio waveform, the respective preceding sample generated in an immediately preceding iteration of the sequential iterations, and a respective preceding difference signal generated in the immediately preceding iteration. In some implementations, the client device is further configured to generate, for the iteration and based on the processing, a difference signal for the iteration. In some implementations, the client device is further configured to determine a respective sample for the iteration using the difference signal for the respective iteration and the respective preceding sample of the audio waveform generated in the immediately preceding iteration, the respective sample for the iteration being one of the samples of the audio waveform. In some implementations, the client device is further configured to cause the client device to render the audio waveform by rendering the samples of the audio waveform using the one or more speakers of the client device.

What is claimed is:
1. A method implemented by one or more processors, the method comprising:
   iteratively generating samples of an audio waveform that is synthesized speech of provided text, wherein generating the samples of the audio waveform comprises:
   at each iteration of a plurality of sequential iterations:

generating a respective difference signal for the iteration using an autoregressive model, wherein the respective difference signal is a predicted difference based on an amplitude of a respective preceding sample of the audio waveform generated in an immediately preceding iteration and an amplitude of a respective sample for the iteration, wherein an input to the autoregressive model comprises:
a respective representation of at least part of the provided text,
the respective preceding sample of the audio waveform generated in the immediately preceding iteration of the sequential iterations, and
a respective preceding difference signal generated in the immediately preceding iteration; and
determining the respective sample for the iteration using the respective difference signal for the iteration and the respective preceding sample of the audio waveform generated in the immediately preceding iteration, the respective sample for the iteration being one of the samples of the audio waveform; and
causing a client device to render the audio waveform by rendering the samples of the audio waveform.

2. The method of claim 1, wherein the one or more processors are one or more processors of the client device, wherein the client device includes memory and one or more speakers, wherein the autoregressive model is stored in the memory, wherein the audio waveform is generated using one or more of the processors of the client device, and wherein the audio waveform is rendered using one or more of the speakers of the client device.

3. The method of claim 2, further comprising:
determining that one or more conditions of the client device are satisfied; and
in response to determining that the one or more conditions are satisfied:
determining to utilize the autoregressive model to generate the audio waveform based on difference signals generated using the autoregressive model, instead of utilizing an alternative autoregressive model that is more resource intensive to utilize than the autoregressive model.

4. The method of claim 3, wherein the one or more conditions of the client device include the client device being powered by a battery which is not fully charged.

5. The method of claim 3, wherein the one or more conditions of the client device include the one or more of the processors of the client device being throttled by heat.

6. The method of claim 1, wherein the one or more processors are one or more processors of a server that is remote from the client device, wherein the autoregressive model is stored in memory of the server, wherein the audio waveform is generated using one or more of the processors of the server, and wherein causing the client device to render the audio waveform comprises transmitting the samples of the audio waveform to the client device.

7. The method of claim 6, further comprising:
determining that one or more conditions of the server are satisfied; and
in response to determining that the one or more conditions are satisfied:
determining to utilize the autoregressive model to generate the audio waveform based on difference signals generated using the autoregressive model, instead of utilizing an alternative autoregressive model that is more resource intensive to utilize than the autoregressive model.

8. The method of claim 7, wherein the one or more conditions of the server include one or more of the processors of the server being throttled by heat.

9. The method of claim 1, wherein the autoregressive model is a recurrent neural network model.

10. The method of claim 1, wherein the difference signal generated for the iteration is a smaller number of bits than a number of bits for the respective sample of the audio waveform of the iteration.

11. The method of claim 1, wherein the difference signal is a discrete value selected from a difference signal distribution.

12. The method of claim 11, wherein the difference signal distribution is a log uniform distribution.

13. The method of claim 11, wherein the difference signal distribution includes 256 discrete values or 512 discrete values.

14. The method of claim 11, wherein the difference signal distribution includes at least a first difference signal value and a second difference signal value,
wherein the first difference signal value represents a change in sound corresponding to a high amplitude high frequency sound not found in human speech, or found in human speech with less than a threshold frequency,
wherein the second difference signal value represents a change is sound found in human speech, or found in human speech with greater than a threshold frequency, and
wherein the change in sound represented by the first difference signal value is greater than the change in sound represented by the second difference signal value.

15. The method of claim 11, wherein the difference signal distribution excludes a difference signal value representing a high amplitude high frequency sound not found in human speech, or found in human speech with less than a threshold frequency.

16. The method of claim 1, wherein the audio waveform comprises the synthesized speech of the provided text representing an individual word.

17. The method of claim 1, wherein the audio waveform comprises the synthesized speech of the provided text representing an individual phoneme.

18. The method of claim 1, further comprising:
training the autoregressive model using a speech synthesis training instance including provided training text and a ground truth audio waveform corresponding to the provided training text, wherein training the autoregressive model comprises:
at each iteration of a plurality of sequential training iterations of generating samples of a training audio waveform:
generating a respective training difference signal for the iteration using the autoregressive model, wherein the respective training difference signal is a predicted difference based on an amplitude of a respective preceding training sample of the training audio waveform generated in an immediately preceding iteration and an amplitude of a respective training sample for the iteration, wherein an input to the autoregressive model comprises:
a respective representation of at least part of the provided training text, the respective preceding training sample of the training audio waveform generated in the immediately preceding iteration of the sequential training iterations, and a respective preceding training difference signal generated in the immediately preceding iteration;

determining the respective training sample for the iteration using the respective training difference signal for the iteration and the respective preceding training sample of the training audio waveform generated in the immediately preceding iteration, the respective training sample for the iteration being one of the samples of the training audio waveform;

determining a difference between the respective training sample for the iteration and a corresponding sample of the ground truth audio waveform; and updating one or more weights of the autoregressive model based on the determined difference.

19. The method of claim 1, wherein the client device executes an automated assistant client.

20. A method implemented by one or more processors, the method comprising:

training an autoregressive model for synthesizing speech using a speech synthesis training instance, wherein the speech synthesis training instance includes provided training text and a ground truth audio waveform corresponding to the provided training text, and wherein training the autoregressive model comprises:

at each iteration of a plurality of sequential training iterations of generating samples of a training audio waveform:

generating a respective training difference signal for the iteration using the autoregressive model, wherein the respective training difference signal is a predicted difference based on an amplitude of a respective preceding training sample of the training audio waveform generated in an immediately preceding iteration and an amplitude of a respective training sample for the iteration, wherein an input to the autoregressive model comprises:

a respective representation of at least part of the provided training text, the respective preceding training sample of the training audio waveform generated in the immediately preceding iteration of the sequential training iterations, and a respective preceding training difference signal generated in the immediately preceding iteration;

determining the respective training sample for the iteration using the respective training difference signal for the iteration and the respective preceding training sample of the training audio waveform generated in the immediately preceding iteration, the respective training sample for the iteration being one of the samples of the training audio waveform;

determining a difference between the respective training sample for the iteration and a corresponding sample of the ground truth audio waveform; and updating one or more weights of the autoregressive model based on the determined difference.

21. The method of claim 20, wherein training the autoregressive model further comprises:

injecting a noise signal into the autoregressive model downstream from an input layer of the autoregressive model and upstream from one or more memory layers of the autoregressive model.

22. The method of claim 21, wherein the one or more memory layers of the autoregressive model are one or more gated recurrent units, or the one or more memory layers of the autoregressive model are one or more long short term memory units.

23. The method of claim 21, wherein the noise signal is truncated Gaussian noise.

24. A client device comprising:
one or more processors;
one or more speakers;
a memory storing an autoregressive model;
wherein the one or more processors are configured to execute instructions that cause a computing system of the client device to:
iteratively generate samples of an audio waveform that is synthesized speech of provided text, wherein generating the samples of the audio waveform comprises:
at each iteration of a plurality of sequential iterations:
generate a respective difference signal for the iteration using the autoregressive model, wherein the respective difference signal is a predicted difference based on an amplitude of a respective preceding sample of the audio waveform generated in an immediately preceding iteration and an amplitude of a respective sample for the iteration, wherein an input to the autoregressive model comprises:
a respective representation of at least part of the provided text,
the respective preceding sample of the audio waveform generated in the immediately preceding iteration of the sequential iterations, and
a respective preceding difference signal generated in the immediately preceding iteration; and
determine the respective sample for the iteration using the respective difference signal for the iteration and the respective preceding sample of the audio waveform generated in the immediately preceding iteration, the respective sample for the iteration being one of the samples of the audio waveform; and
cause the client device to render the audio waveform by rendering the samples of the audio waveform using the one or more speakers of the client device.

* * * * *

UNITED STATES PATENT AND TRADEMARK OFFICE
CERTIFICATE OF CORRECTION

| | | |
|---|---|---|
| PATENT NO. | : 11,915,682 B2 | |
| APPLICATION NO. | : 17/610934 | |
| DATED | : February 27, 2024 | |
| INVENTOR(S) | : Luis Carlos Cobo Rus et al. | |

It is certified that error appears in the above-identified patent and that said Letters Patent is hereby corrected as shown below:

In the Claims

Column 20, Claim 14, Line 30 after change delete "is" and insert -- in --

Signed and Sealed this
Twenty-eighth Day of May, 2024

Katherine Kelly Vidal
*Director of the United States Patent and Trademark Office*